United States Patent
Fujimoto

(10) Patent No.: US 8,533,367 B2
(45) Date of Patent: *Sep. 10, 2013

(54) CARD AND HOST APPARATUS

(71) Applicant: Kabushiki Kaisha Toshiba, Minato-ku (JP)

(72) Inventor: Akihisa Fujimoto, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,795

(22) Filed: Mar. 11, 2013

(65) Prior Publication Data

US 2013/0191583 A1 Jul. 25, 2013

Related U.S. Application Data

(63) Continuation of application No. 11/494,475, filed on Jul. 28, 2006, now Pat. No. 8,423,679.

(30) Foreign Application Priority Data

Dec. 27, 2004 (JP) ................................ 2004-378300
Dec. 21, 2005 (JP) ................................ 2005-367632

(51) Int. Cl.
*G06F 3/00* (2006.01)

(52) U.S. Cl.
USPC ............... 710/5; 710/10; 710/16; 713/1

(58) Field of Classification Search
USPC ..................... 710/5, 10, 16; 713/1
See application file for complete search history.

(56) References Cited

U.S. PATENT DOCUMENTS

| | | | |
|---|---|---|---|
| 5,438,359 A | 8/1995 | Aoki | |
| 5,742,934 A | 4/1998 | Shinohara | |
| 6,035,357 A | 3/2000 | Sakaki | |
| 6,149,319 A | 11/2000 | Richter et al. | |
| 6,233,016 B1 | 5/2001 | Anderson et al. | |
| 6,354,489 B2 | 3/2002 | Tanaka | |
| 6,813,668 B2 | 11/2004 | Tseng et al. | |
| 6,842,818 B2 | 1/2005 | Okamoto et al. | |
| 6,901,457 B1 | 5/2005 | Toombs et al. | |
| 7,114,015 B2 | 9/2006 | Alva et al. | |
| 7,159,766 B2 | 1/2007 | Wurzburg et al. | |
| 7,173,863 B2 | 2/2007 | Conley et al. | |
| 7,194,638 B1 | 3/2007 | Larky | |
| 7,237,052 B2 | 6/2007 | Okamoto et al. | |
| 7,305,505 B2 | 12/2007 | Cedar et al. | |
| 7,305,535 B2 | 12/2007 | Harari et al. | |
| 7,836,236 B2 | 11/2010 | Chou et al. | |
| 7,913,061 B2 | 3/2011 | Gorobets et al. | |
| 7,934,037 B2 | 4/2011 | Chou et al. | |

(Continued)

FOREIGN PATENT DOCUMENTS

| | | |
|---|---|---|
| EP | 1 132 824 | 12/2001 |
| JP | 6-124596 A | 5/1994 |

(Continued)

*Primary Examiner* — Ernest Unelus

(74) *Attorney, Agent, or Firm* — Oblon, Spivak, McClelland, Maier & Neustadt, L.L.P.

(57) ABSTRACT

A host apparatus, into which a card having a nonvolatile semiconductor memory is inserted, issues a check command to the card. The check command instructs to send information on whether the card supports a termination process in which the card shifts into a state ready for a stop of power supply from the host apparatus.

9 Claims, 8 Drawing Sheets

(56) References Cited

U.S. PATENT DOCUMENTS

| | | |
|---|---|---|
| 2001/0021956 A1 | 9/2001 | Okamoto et al. |
| 2002/0160808 A1 | 10/2002 | Uehara et al. |
| 2003/0028699 A1 | 2/2003 | Holtzman et al. |
| 2004/0015629 A1 | 1/2004 | Inui et al. |
| 2004/0145660 A1 | 7/2004 | Kusaka |
| 2004/0177215 A1 | 9/2004 | Nagamasa et al. |
| 2004/0187042 A1 | 9/2004 | Kawanabe |
| 2005/0094001 A1 | 5/2005 | Saga |
| 2005/0160217 A1 | 7/2005 | Gonzalez et al. |
| 2005/0204092 A1 | 9/2005 | Masuyama et al. |
| 2006/0053246 A1 * | 3/2006 | Lee .............................. 711/100 |
| 2008/0077719 A1 | 3/2008 | Cedar et al. |
| 2009/0013125 A1 | 1/2009 | Mizushima et al. |
| 2009/0037651 A1 | 2/2009 | Gorobets |
| 2010/0312933 A1 | 12/2010 | Chou et al. |

FOREIGN PATENT DOCUMENTS

| | | |
|---|---|---|
| JP | 2002-051056 A | 2/2002 |
| JP | 2002-150230 A | 5/2002 |
| JP | 2002-175090 A | 6/2002 |
| JP | 2002-237977 A | 8/2002 |
| JP | 2002-328153 A | 11/2002 |
| JP | 2004-192452 | 7/2004 |
| WO | WO 2006/057049 A1 | 6/2006 |

* cited by examiner

| Pin number | Signal |
|---|---|
| First pin | Card detection / data 3 (DAT 3) |
| Second pin | Command (CMD) |
| Third pin | Vss |
| Fourth pin | Vdd |
| Fifth pin | Clock (CLK) |
| Sixth pin | Vss |
| Seventh pin | Data 0 (DAT 0) |
| Eighth pin | Data 1 (DAT 1) |
| Ninth pin | Data 2 (DAT 2) |

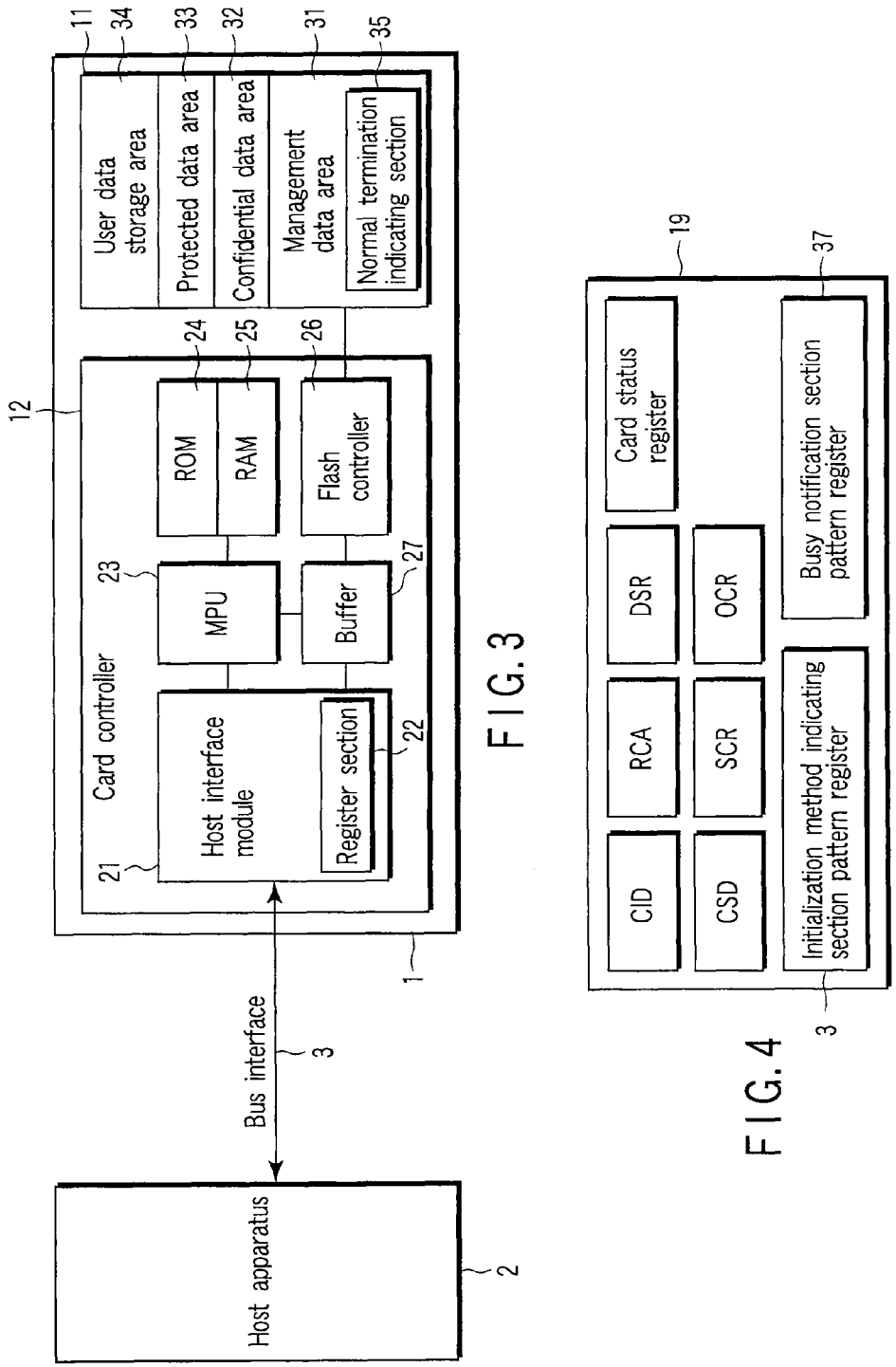

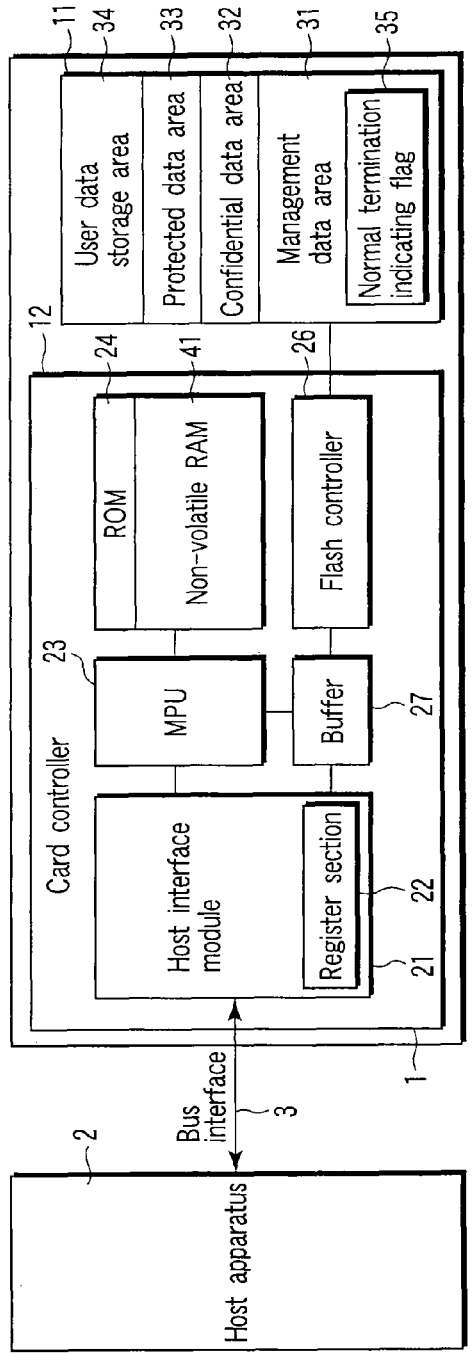
F I G. 15
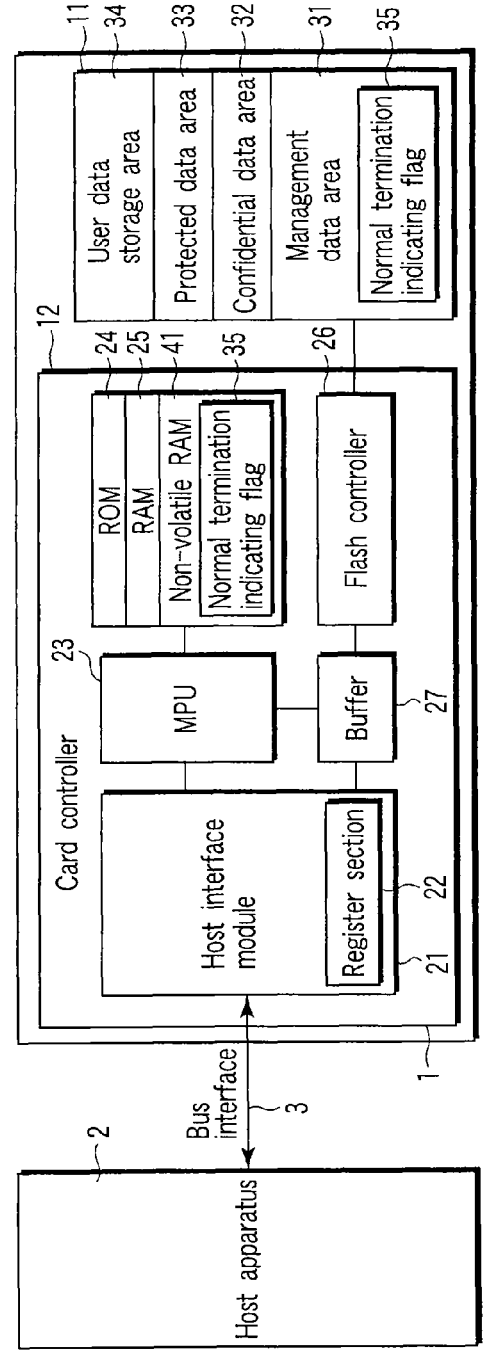
F I G. 16

CARD AND HOST APPARATUS

CROSS-REFERENCE TO RELATED APPLICATIONS

This is a Continuation of U.S. application Ser. No. 11/494,475, filed Jul. 28, 2006, which is a Continuation Application of PCT Application No. PCT/JP2005/024205, filed Dec. 26, 2005, which was published under PCT Article 21(2) in English, the entire contents of each of which are incorporated herein by reference.

This application is based upon and claims the benefit of priority from prior Japanese Patent Applications No. 2004-378300, filed Dec. 27, 2004; and No. 2005-367632, filed Dec. 21, 2005, the entire contents of both of which are incorporated herein by reference.

BACKGROUND OF THE INVENTION

1. Field of the Invention

The present invention relates to a card and a host apparatus, for example, process at the termination of the power supply from the host apparatus and initialization of a memory card and a host apparatus that uses the memory card.

2. Description of the Related Art

In recent years, a memory card, which is a removable storage device, has often been used in various portable electronic apparatuses such as personal computers, personal digital assistants (PDA), cameras, or cellular phones. Among the memory cards, PC cards and small-sized SD™ cards are gathering much attention. The SD™ card is a memory card containing a flash memory, a card controller, and the like. The SD™ card is specifically designed to meet requirements such as a reduction in size and an increase in capacity and speed.

The prior art specifies an initialization time of at most one second for the SD™ card. Thus, all the conventional SD™ cards are manufactured in conformity with this specification. However, as the capacity of the SD™ card increases, it becomes more difficult to reduce the initialization time itself. Accordingly, the reduction of the initialization time is limited. In particular, the initialization time cannot be simply increased even with an increase in the capacity of the SD™ card when the card is used for digital cameras, movie cameras, or the like, because these devices are required to be able to carry out photographing immediately after power-on.

BRIEF SUMMARY OF THE INVENTION

According to a first aspect of the present invention, there is provided a host apparatus into which a card having a nonvolatile semiconductor memory is inserted and which issues a check command to the card, the check command instructing to send information on whether the card supports a termination process in which the card shifts into a state ready for a stop of power supply from the host apparatus.

According to a second aspect of the present invention, there is provided a card having a nonvolatile semiconductor memory, being inserted into a host apparatus, and supporting a termination process in which the card shifts into a state ready for a stop of power supply from the host apparatus, the card sending a response which shows the card supports the termination process when the card receives a check command instructing to send information on whether the card supports the termination process.

BRIEF DESCRIPTION OF THE SEVERAL VIEWS OF THE DRAWING

FIG. 3 is a block diagram showing the configura-tion of hardware in the card according to the first embodiment;

FIG. 4 is a diagram showing, in detail, the configuration of a register section of the card according to the first embodiment;

FIG. 15 is a block diagram showing the configuration of hardware in a card according to a second embodiment of the present invention; and FIG. 16 is a block diagram showing the configuration of hardware in a card according to a third embodiment of the present invention.

DETAILED DESCRIPTION OF THE INVENTION

Figures 1, 2:
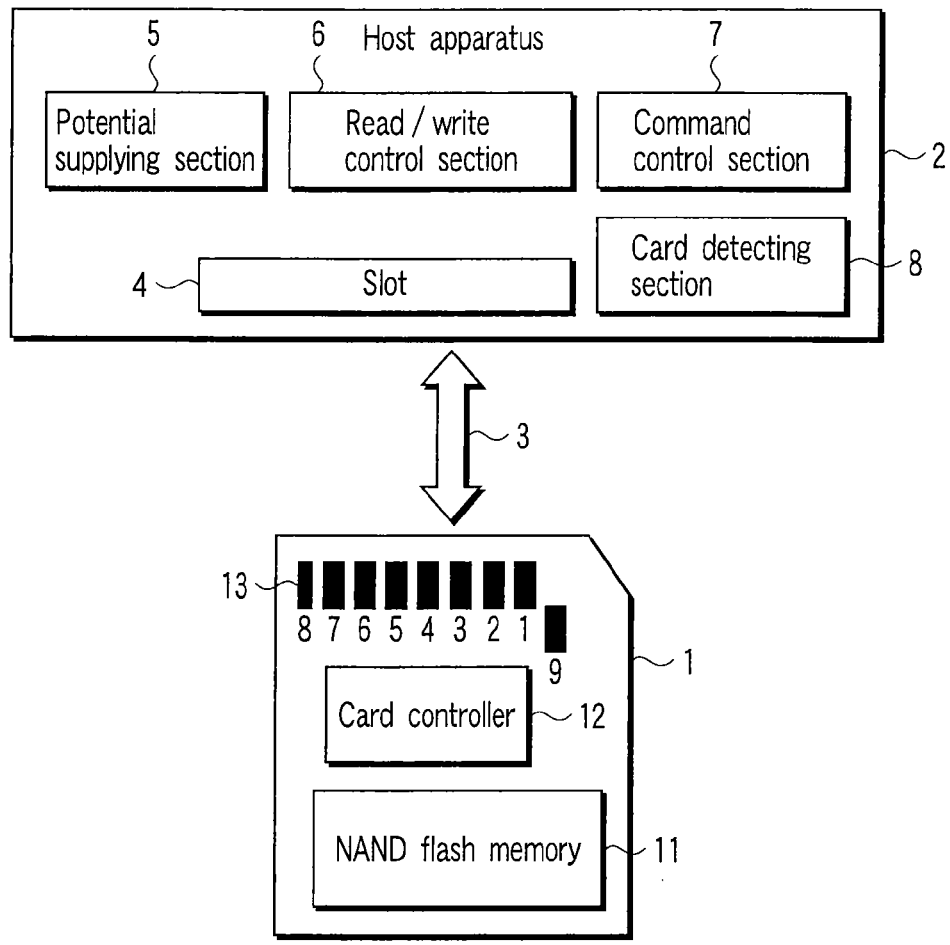
FIG. 1 is a diagram showing the configuration of an essential part of a memory card according to a first embodiment of the present invention.
FIG. 2 is a diagram showing the assignment of signals to signal pins in the card according to the first embodiment.

In connection with the problems described in the section "Background of the Invention", it is possible to use a technique for continuously supplying a power supply potential to an SD™ card even after a host apparatus has been powered off. This technique eliminates the need to initialize the SD™ card when the host apparatus is turned on. Consequently, the SD™ card can be used immediately after the host apparatus has been powered on. However, a leakage current from the SD™ card may disadvantageously cause batteries for the host apparatus to be exhausted. It is technically difficult to reduce the leakage current. Thus, the employment of this technique is difficult.

Embodiments of the present invention will be described below with reference to the drawings. In the description below, components having substantially the same functions and configurations will be denoted by the same reference numerals. Duplicate descriptions will be given only when required.

First Embodiment

FIG. 1 shows the configuration of an essential part of a card according to a first embodiment of the present invention. A card (memory card) 1 transmits and receives information to and from a host apparatus via a bus interface 3. The card 1 comprises a NAND type flash memory chip 11, a card controller 12 that controls the NAND type flash memory 11, and a plurality of signal pins (first to ninth pins) 13.

The plurality of signal pins 13 are electrically connected to the card controller 12. Signals are assigned to the plurality of signal pins 13, that is, the first to ninth pins, for example, as shown in FIG. 2. Data 0 to 3 are assigned to the seventh pin, the eighth pin, the ninth pin, and the first pin, respectively. The first pin is also assigned to a card detection signal. Moreover, the second pin is assigned to a command. The third and sixth pins are assigned to a ground potential Vss. The fourth and fifth pins are assigned to a power supply potential Vdd and a clock signal, respectively.

The card 1 is formed so that it can be inserted into and released from a slot 4 provided in the host apparatus 2. The host apparatus 2 includes a potential supplying section 5, a read/write control section 6, a command control section 7, a card detecting section 8, and the like.

The potential supplying section 5, the read/write section 6, the command control section 7 transmit and receive various signals and data to and from the card controller 12 in the card 1 via the first to ninth pins. For example, when data are to be written to the card 1, the command control section 7 transmits a write command to the card controller 12 via the second pin as a serial signal. On this occasion, in response to a clock signal supplied to the fifth pin, the card controller 12 loads the write command provided to the second pin. The write command is serially input to the card controller 12 utilizing only the second pin. The card detecting section 8 detects whether or not any card is inserted into the slot 4.

An interface for a NAND type flash memory is employed for communications between the NAND type flash memory 11 and the card controller 12. Accordingly, although not shown, the NAND type flash memory 11 and the card controller 12 are connected together by 8-bit I/O lines. For example, when the card controller 12 writes data to the NAND type flash memory 11, the card controller 12 sequentially inputs a data input command 80H, a column address, a page address, data, and a program command 10H to the NAND type flash memory 11 via the I/O lines. Here, "H" in the command 80H indicates a hexadecimal number. In actuality, an 8-bit signal "10000000" is provided to the 8-bit I/O lines in parallel. That is, with the NAND type flash memory interface, a command of plural bits is provided to the I/O lines in parallel. Further, with the NAND type flash memory interface, commands and data are communicated to the NAND type flash memory 11 using the same I/O lines. Thus, an interface used to allow a host controller in the host apparatus 2 and the card 1 to communicate is different from the interface used to allow the NAND type flash memory 11 and the card controller 12 to communicate.

FIG. 3 is a block diagram showing the configura-tion of hardware in the card according to the first embodiment of the present invention. As shown in FIG. 3, the host apparatus 2 comprises hardware and software used to access the card 1 connected to the apparatus 2 via the bus interface 3. The card 1 is operated by power supplied by the potential supplying section 5 when connected to the host apparatus 2. The card 1 executes a process in accordance with an access from the host apparatus 2.

For the NAND type flash memory 11, an erasure block size used for erasure (a block size for an erasure unit) is set at a predetermined value (for example, 256 kBytes). Further, data are written to and read from the NAND type flash memory 11 using units (for example, 2 kBytes) called pages.

The card controller 12 has a host interface module 21, an micro processing unit (MPU) 23, a flash controller 26, a read-only memory (ROM) 24, for example, a random access memory (RAM) 25 serving as a temporary storage memory, and a buffer 27. The card controller 12 stores system data concerning the internal physical state of the NAND type flash memory 11. The RAM 25 is implemented using a volatile memory such as a static random access memory (SRAM). The system data includes data indicating the ordinal of logical sector address data contained in a certain physical block address, which blocks are writable, and the like.

The host interface module 21 interfaces the card controller 12 and the host apparatus 2 together and includes a register section 22. FIG. 4 shows the configuration of the register section 22 in detail. The register section 22 has various registers including a card status register, CID, RCA, DSR, CSD, SCR, and OCR. The register section further includes an initialization method indicating section pattern register 36 and a busy notification section pattern register 37. The initialization method indicating section pattern register 36 holds a bit pattern which is to be contained in an initialization method indicating section in a response to a initialization command.

These registers are defined as described below. The card status register is used for normal operations and stores, for example, error information described later. CID, RCA, DSR, CSD, SCR, and OCR are mainly used to initialize the card 1. CID (Card IDentification number) stores the individual number of the card 1. RCA (Relative Card Address) stores a relative card address (dynamically determined by the host apparatus during initialization). DSR (Driver Stage Register) stores the bus driving force of the card 1 and the like. CSD (Card Specific Data) stores characteristic parameter values of the card 1. SCR (SD Configuration data Register) stores the arrangement of data in the card 1. Moreover, OCR (Operation Condition Register) stores an operating voltage if the card 1 has a limited operational range voltage.

MPU (control section) 23 controls the operation of the whole card 1. When for example, the card 1 is supplied with power, MPU 23 reads firmware (control program) stored in ROM 24 and loads it onto RAM 25. MPU 23 then executes a predetermined process to create various system data on RAM 25. MPU 23 also receives a write command, a read command, or an erasure command from the host apparatus 2. MPU 23 then executes a predetermined process on the NAND type flash memory 11 or controls a data transfer process through a buffer 26.

ROM 24 stores, for example, control programs controlled by MPU 23. RAM 25 is used as a work area for MPU 23 to store control programs and various system data. Moreover, the flash controller 26 executes an interfacing process between the card controller 12 and the NAND type flash memory 11.

A buffer 27 temporarily stores a specified amount of data (for example, for one page) when data sent by the host apparatus 2 are written to the NAND type flash memory 11. The buffer 27 also temporarily stores a specified amount of data when data read from the NAND type flash memory 11 are transmitted to the host apparatus 2.

Figure 5:
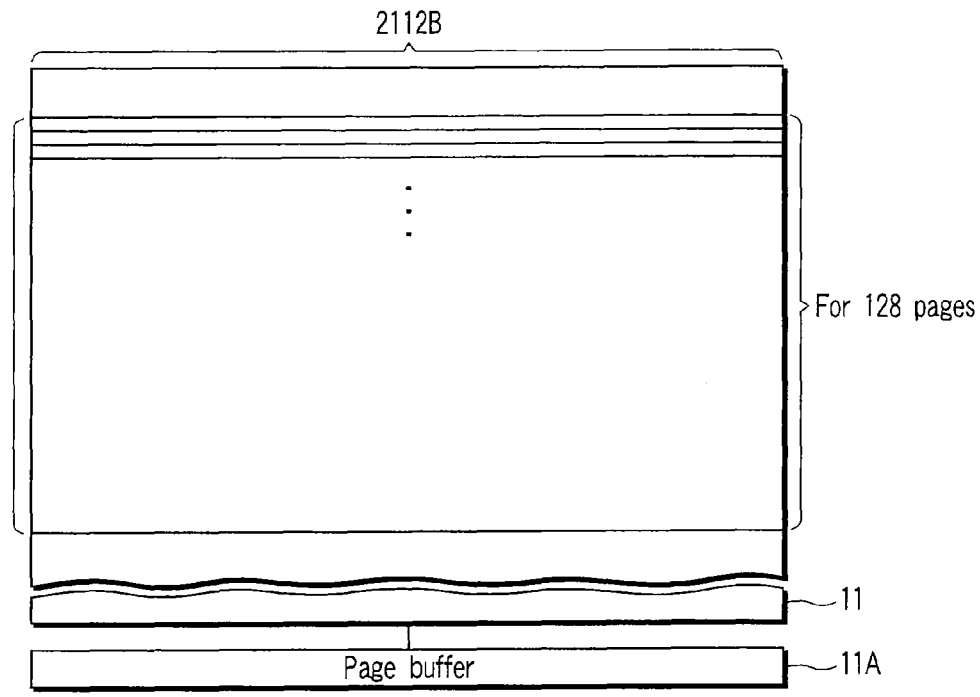
FIG. 5 is a diagram showing the arrangement of data in a NAND type flash memory.

FIG. 5 shows the arrangement of data in the NAND type flash memory 11. Each page of the NAND type flash memory 11 has 2112 Bytes ((512 Bytes of data storage section+10 Bytes of redundant section)×4+24 Bytes of management data storing section). One erasure unit amounts to 128 pages (256 kBytes+8 kBytes (in this case, k is 1,024)).

Further, the NAND type flash memory 11 comprises a page buffer 11A used to input and output data to and from the flash memory. The storage capacity of the page buffer 11A is 2,112 Bytes (2,048 Bytes+64 Bytes). For a data write or the like, the page buffer 11A inputs and outputs data to and from the flash memory for each page equal to its own storage capacity.

If the storage capacity of the NAND type flash memory 11 is, for example, 1 Gbits, the number of 256-kByte blocks (erasure units) is 512.

Further, FIG. 5 illustrates the case in which the erasure unit is 256 kBytes. However, it is also effective in a practical sense to construct the memory so that the erasure unit is, for example, a 16-kByte block. In this case, each page has 528 Bytes (512 Bytes of data storing section+16 Bytes of redundant section). One erasure unit amounts to 32 pages (16 kBytes+0.5 kBytes (in this case, k is 1,024)).

An area of the NAND type flash memory 11 in which data is written (data storage area) is divided into a plurality of areas in accordance with the type of data saved, as shown in FIG. 3. The NAND type flash memory 11 comprises, as data storage areas, a user data area 34 in which user data are stored, a management data area 31 in which management information concerning the card 1 is stored, a confidential data area 32 in which confidential data are stored, and a protect data area 33 in which important data are stored.

The user data area 34 can be freely accessed and used by the user of the card 1. The protect data area 33 can be accessed only if the host apparatus 2 is proved to be valid on the basis of the mutual authenti-cation between the card 1 and the host apparatus 2 connected to the card 1.

The management data area 31 stores card information such as the media ID of the card 1 and system data. The confidential data area 32 stores key information used for ciphering, confidential data used for authentication, and security information.

The operation mode of the card is roughly classified into an SD mode and an SPI mode. In the SD mode, the card 1 is set to an SD 4-bit mode or SD 1-bit mode in accordance with a bus width change command from the host apparatus 2.

Here, a focus will be placed on four pins, that is, a data 0 pin (DAT0) to a data 3 pin (DAT 3). In the SD 4-bit mode, in which data are transferred for each 4-bit width, all the four pins, that is, the data 0 pin (DAT0) to data 3 pin (DAT 3), are used for data transfer. In contrast, in the SD 1-bit mode, in which data are transferred for each 1-bit width, only the data 0 pin (DAT0) is used for data transfer, whereas the data 1 pin (DAT1) and the data 2 pin (DAT2) are not used for data transfer. On the other hand, the data 3 pin (DAT3) is used for, for example, an asynchronous interruption made by the card 1 in the host apparatus 2. In the SPI mode, the data 0 pin (DAT0) is used for a data signal line (DATA OUT) from the card 1 to the host apparatus 2. A command pin (CMD) is used for a data signal line (DATA IN) from the host apparatus 2 to the card 1. The data 1 pin (DAT1) and the data 2 pin (DAT2) are not used. Further, in the SPI mode, the data 3 pin (DAT3) is used to send a chip select signal CS from the host apparatus 2 to the card 1.

Now, with reference to FIGS. 6 to 14, description will be given of the operation of the card 1 and the host apparatus 2.
(Check Operation for the Support of Terminal Operation)

The host apparatus 2 determines if the card 1 supports or not a termination process (to be described later) which a function stop command instructs to take. The determination only needs to be completed any moment before the host apparatus stops supplying power.

Figure 6:
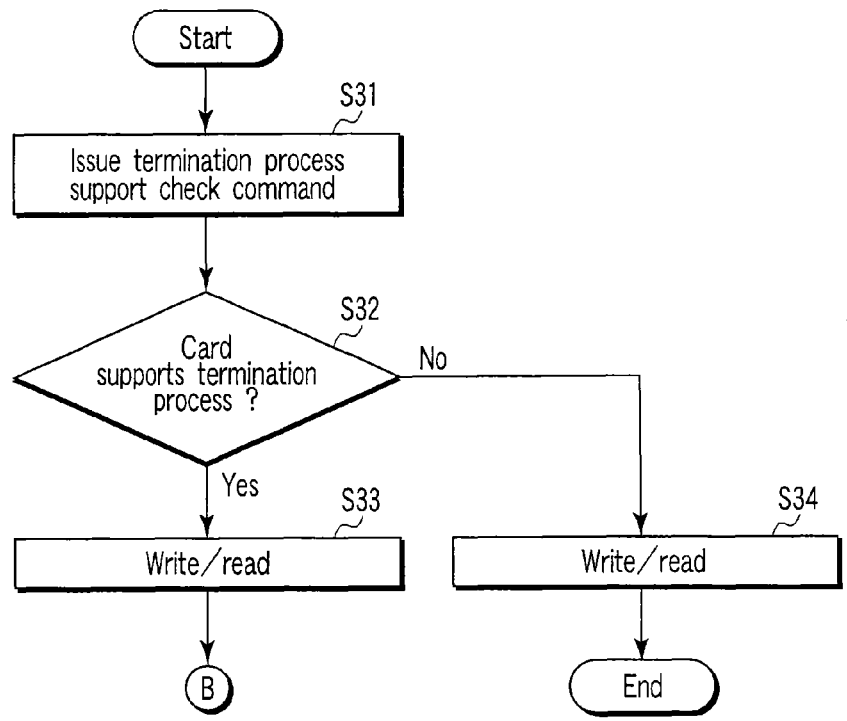
FIG. 6 is a flowchart showing a process to check if a termination process according to the first embodiment is supported.

FIG. 6 shows a flowchart of the process which the host apparatus takes to know if the card 1 supports the termination process. As shown FIG. 6, the host apparatus 2 issues a command to the card 1 for determining if the card 1 supports the termination process (step S31). An example of such a command may include so called a switch command. The switch command is used in, for example, a check function or a set function. A mode 0, for example, is used as the check function and a mode 1 the set function. The mode displaying part in the command may be set either "0" or "1" to switch the mode.

Figure 7:
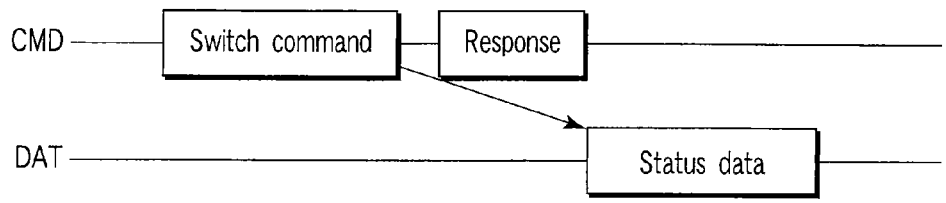
FIG. 7 is a timing chart of a switch command and a response thereto.

When host apparatus 2 accesses the card 1, the host apparatus 2 needs to know the specification of the card 1. The host apparatus 2 provides the card 1 with the switch command which is set to have the check function as shown in FIG. 7. The host apparatus 2 then receives status data from the card 1 on the data line DAT to know the card's specification.

When the card 1 which supports the termination process receives the switch command, the card 1 sends back status data which states the card 1 supports the process. The host apparatus 2 receives the status data to know the termination process can be performed before the stop of the power supply.

In contrast, if the card 1 supports the switch command but does not support the termination process, the status data expresses that the card 1 does not support the process. The host apparatus 2 receives such a status data to know that the termination process cannot be executed.

If the card 1 does not support the switch command, it does not send back the response and the status data. Therefore, the host apparatus 2 knows the termination process cannot be carried out. The host apparatus can examine the version information of the card 1 to know the support of the termination process by the card 1.

If the card 1 supports various switchable operation modes, the host apparatus 2 issues the switch command which is in the set mode and states a operation mode to be taken by the card 1.

Alternatively, the host apparatus 2 may use an initialization command to determine if the support or non-support of the termination process by the card 1.

Figure 8:
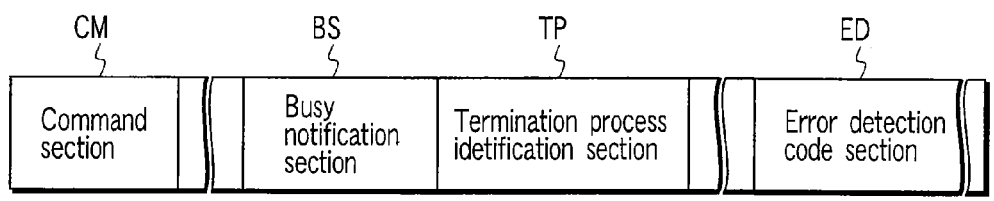
FIG. 8 is a diagram showing the a part of the contents of an initialization command according to the first embodiment.

FIG. 8 shows a part of contents of an initialization command according to the first embodiment. As shown in FIG. 8, the initialization command includes a command section CM, termination process identification section TP, busy notification section BS and error detection code section which may contain, for example, an cyclic redundancy check (CRC). The command section contains an index to identify the command.

The host apparatus 2 provides the card with the initialization command whose termination process identification section TP is set (to, for example, "1") to express that the host apparatus 2 supports the termination process according to the present embodiment.

Receiving the initialization command, the card 1 sends back a response to the host apparatus 2. The response has a format the same as the command. If the card 1 supports the termination process, the card 1 sends back the response which states the it supports the termination process in the termination process identification section TP, that is the response whose termination process identification section TP has the same bit as the command. The host apparatus 2 receives the response to know that it can take the termination process with the card 1.

If the card 1 recognizes the command used for determining the support or non-support of the termination process but does not support the process, it sends back the response whose termination process identification section is set (to, for example, "0") to express that the card 1 does not support the termination process.

After the host apparatus 2 determines if the card 1 supports or not the termination process at the step S 32, it writes data to or read data from the card 1 (step S33, S34) required times.

(Terminal Operation)

The host apparatus 2 takes the termination process described in the following in response to, for example, the power-off of the host apparatus 2. If the card 1 does not support the termination process, the host apparatus 2 stops supplying the card 1 with power in the conventional way to stop the access from the host apparatus 2 to the card 1.

Figure 10:
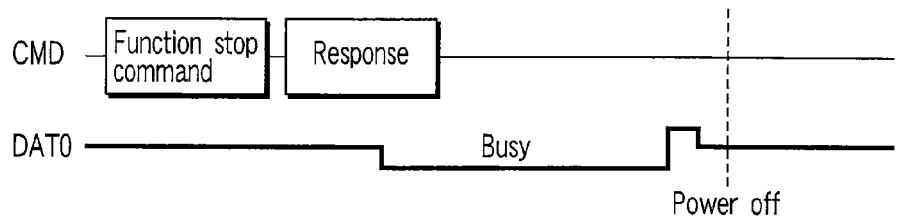
FIG. 10 is a timing chart showing transmissions and receptions of signals between the host apparatus and the card according to the first embodiment which occur after the card has received the function stop command and before it completes a termination process.
Figure 9:
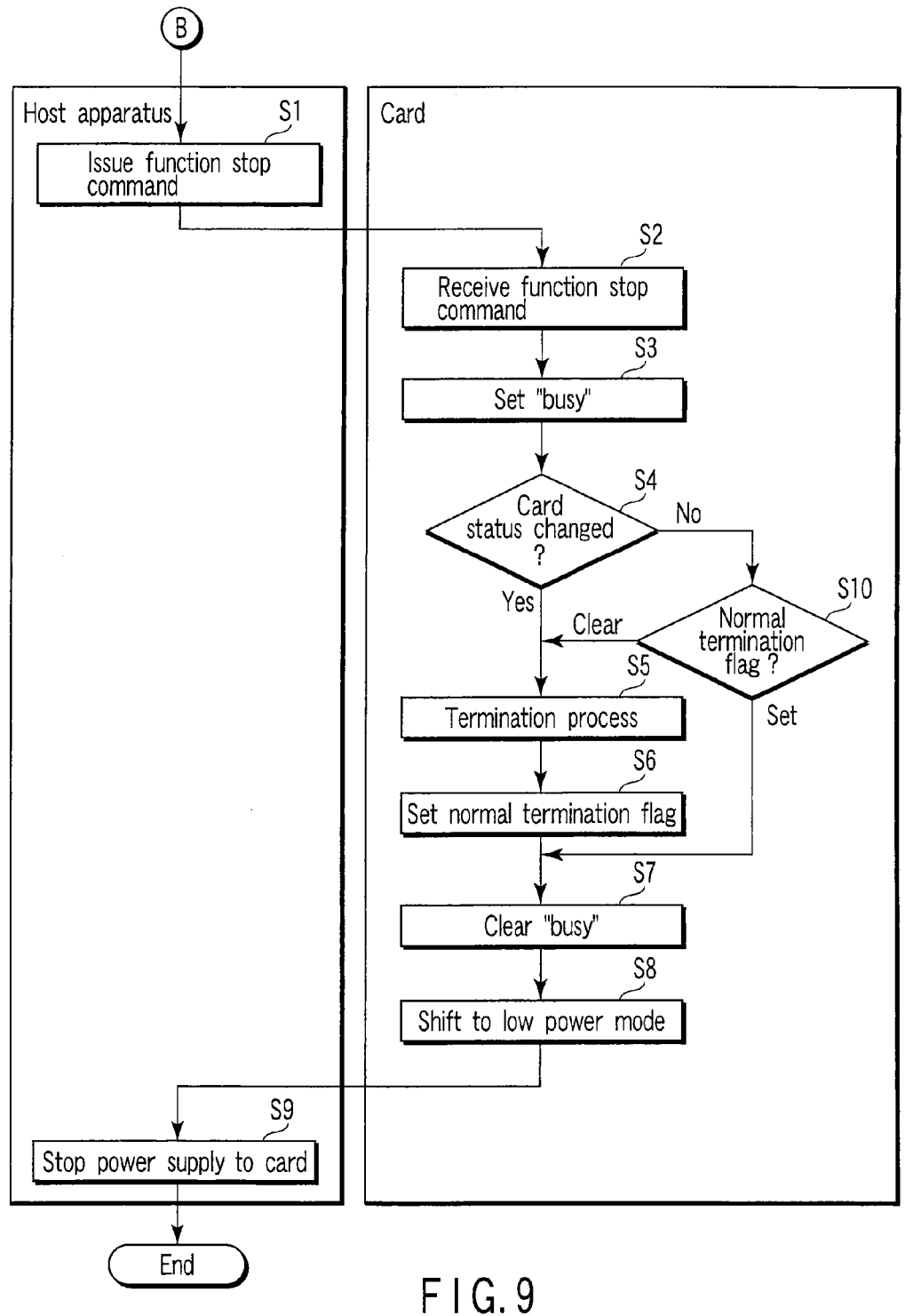
FIG. 9 is a flowchart showing the termination process executed by the card and host apparatus according to the first embodiment during initialization.

In contrast, if the card 1 supports the termination process, the host apparatus 2 and the card 1 execute the termination process shown in FIG. 9. FIG. 9 is a flowchart showing the termination sequence which the card 1 and host apparatus 2 according to the first embodiment take. FIG. 10 is a timing chart at the termination process.

Figure 11:
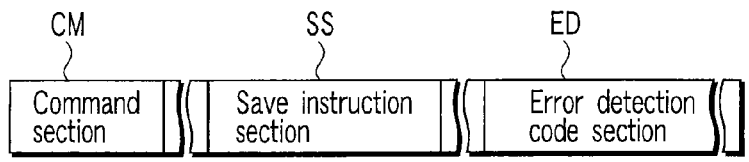
FIG. 11 is a diagram showing an essential part of the contents of a function stop command issued by the host apparatus according to the first embodiment.

As shown in FIGS. 9 and 10, the host apparatus 2 first issues a function stop command on the command line CMD to the card 1 (step S1). The function stop command may be the aforementioned switch command or newly defined one. When using the switch command, the function stop command has at least a command section CM and a save instruction section SS as shown in FIG. 11. The error detection code section ED may be provided. When using a newly defined command, the command section CM itself indicates this command is a function stop command, therefore the save instruction section SS is not necessary. The save instruction section SS can take a bit pattern (for example, "1") indicating at least that the card 1 should shift into an power-off ready state in which the card is ready for the stop of the power supply after, for example, saving the system data. Further, the save instruction section SS may have a bit pattern (for example, "0") indicating that the card 1 may shift into the power-off ready state without saving the system data.

The card 1 receives the function stop command (step S2). In response to this command, the card 1 sends back a response on the command line CMD and starts transmitting a signal (for example "0") to the host apparatus 2 indicating that the card 1 is busy executing the termination process (step S3).

Determination is carried out if the status of the card 1 has changed or not after start of power supply (step S4). The status of the card 1 is regarded to have changed if, for example, data has been written in the card 1, the lock/unlock function has been changed, or programmable CSD register has been set into another state.

When the status of the card 1 has changed, the card 1 executes the termination process (step S5). The termination process may include variety processes and may be saving of the system data stored in the RAM 25 to the NAND type flash memory 11. The system data can be saved to, for example, a management data area 31. Alternatively, the system data may be saved to a nonvolatile memory provided separately from the NAND type flash memory 11. All or a part of the system data may be saved.

Examples of the system data include an address translation table and an assign table. The address translation table is used to convert a logical address into a physical address for the NAND type flash memory 11. The assign table is used to distinguish blocks used to store data (blocks to which logical blocks are assigned) from those not used to store data (blocks to which logical blocks are not assigned).

The terminal operation may include the following procedures. A card cannot know when power supply from a host apparatus stops if a function stop command is not defined. Therefore, the card must write whole data which the host apparatus requires to write into a NAND type flash memory 11 to prepare a possible sudden power-off.

Figure 12:
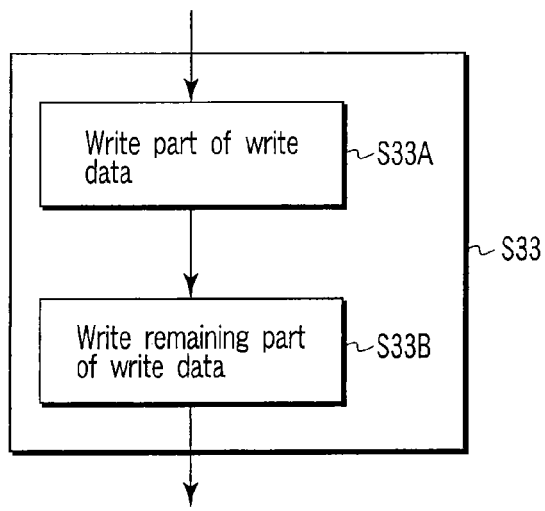
FIG. 12 is a diagram showing another example of a part of the process shown in FIG. 6.

In contrast, the function stop command can let the card 1 know that power supply from the host apparatus 2 is about to stop in advance. As shown in FIG. 12, this advantage allows the card 1 to write only part of data which the host apparatus 2 asked to write in the NAND type flash memory 11 (step S33A) and remaining part thereof in following timing (step S33B) such as one with no access by the host apparatus 2. When this method taken, the remaining part of data may be stored in, for example, the RAM 25 or a cache area (temporal write area) in the NAND type flash memory 11. This write method allows the card 1 to take shorter time to write data in response of one write command than to write the whole data.

Writing of the remaining part of data to be written must be finished before the stop of the power supply to the card 1. Therefore, an example of the termination process includes writing of the remaining part of data to the NAND type flash memory 11.

Note that the host apparatus may instruct the card to write the whole or a part of data after it knows the card 1 supports the termination process or the card 1 decides which one should be executed by itself.

Then, in FIG. 9, the card 1 sets a bit pattern (for example, "1") in itself indicating that the termination process has been completed (step S6). The bit pattern (flag) may be stored in area (normal termination indicating flag 35) in the NAND type flash memory 11, for example, in the management data area 31, as shown in FIG. 31.

Then, once the termination process has been completed, the card 1 transmits a signal to the host apparatus 2 indicating that the busy state has been cleared (step S7). The host apparatus 2 then knows the clearance of the busy state.

Following the clearance of the busy state, the card 1 then shifts into a low power mode (step S8). The low power mode allows the power consumption of the card to be lower than the normal state. The power supply is thus interrupted except for parts required to shift to an initialization process. Thus, the shift of the card 1 into the low power mode has been normally completed.

The low power mode can be realized by limiting the supply of a clock signal, for example, as in the case of the two methods described below. With a first method, a clock circuit in the card 1 includes a phase-locked loop (PLL) circuit and an oscillator, and the oscillator is stopped. In this case, the power consumption by the oscillator is reduced. Further, for example, the PLL circuit stores an initial frequency value so that the oscillation frequency of the clock circuit can be stabilized in a short time after the power supply starts.

With a second method, a clock supplied by the host apparatus 2 is stopped. While the card 1 is in operation, the host apparatus 2 supplies a clock signal to a majority of flip-flops located at a front end of the card 1. The power consumption by the card 1 can be reduced by stopping the supply of the clock signal to, for example, the flip-flops other than those located in a command decode circuit.

After shifting into the power-off ready state (the inactive state), the card 1 does not accept any commands including a read/write commands until initialization is started again. This avoids changing the saved system data before the power supply to the card 1 is stopped.

In response to the clearance of the busy state, the host apparatus 2 stops the power supply to the card 1 (step S9).

After the clearance of the busy state, the card 1 shifts to the low power mode, as described above. This gives advantages described below. Normally, the power supply to the card 1 is stopped immediately after the busy state is cleared. However, the interruption of the power supply from the host apparatus 2 may fail for some reason. In this case, the power consumption by the host apparatus 2 can be reduced by avoiding the supply of a useless potential to the card 1.

The host apparatus may provide a time-out control to the busy state of the card 1. The host apparatus 2, for example, stops supplying the card 1 with the power if the busy state continues longer than the set time-out period. In this case, the normal termination indicating flag 35 is set to a bit pattern (for example, "0") indicating that the termination process has not been completed.

When the status of the card 1 has not changed after the power-on and the termination process has been completed the last time the power is off, termination process is not necessary. Therefore, when the normal termination indicating flag 35 is set in the step S10, then step S7 follows.

(Initialization Process)

Figure 13:
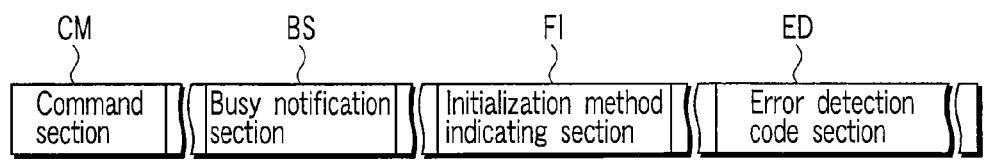
FIG. 13 is a diagram showing a part of the contents of an initialization command and an response thereto according to the first embodiment.

Now, with reference to FIG. 13, description will be given of an initialization command and a response thereto. FIG. 13 shows part of contents of the initialization command and the response when the command and the response have the same format.

As shown in FIG. 13, the initialization command has at least a command section CM and a busy notification section BS. The initialization command does not have an initialization method indicating section FI. An error detection code section ED may be provided.

In the response, the initialization method indicating section FI, which is not necessary, shows with which initialization method the card 1 has carried out an initialization. The busy notification section BS is formed with a bit pattern indicating that the card 1 is being initialized (for example, the bit pattern "1") or that initialization has been completed (for example, the bit pattern "0"). The initializing method indicating section FI is not effective until the busy state is cleared.

Figure 14:
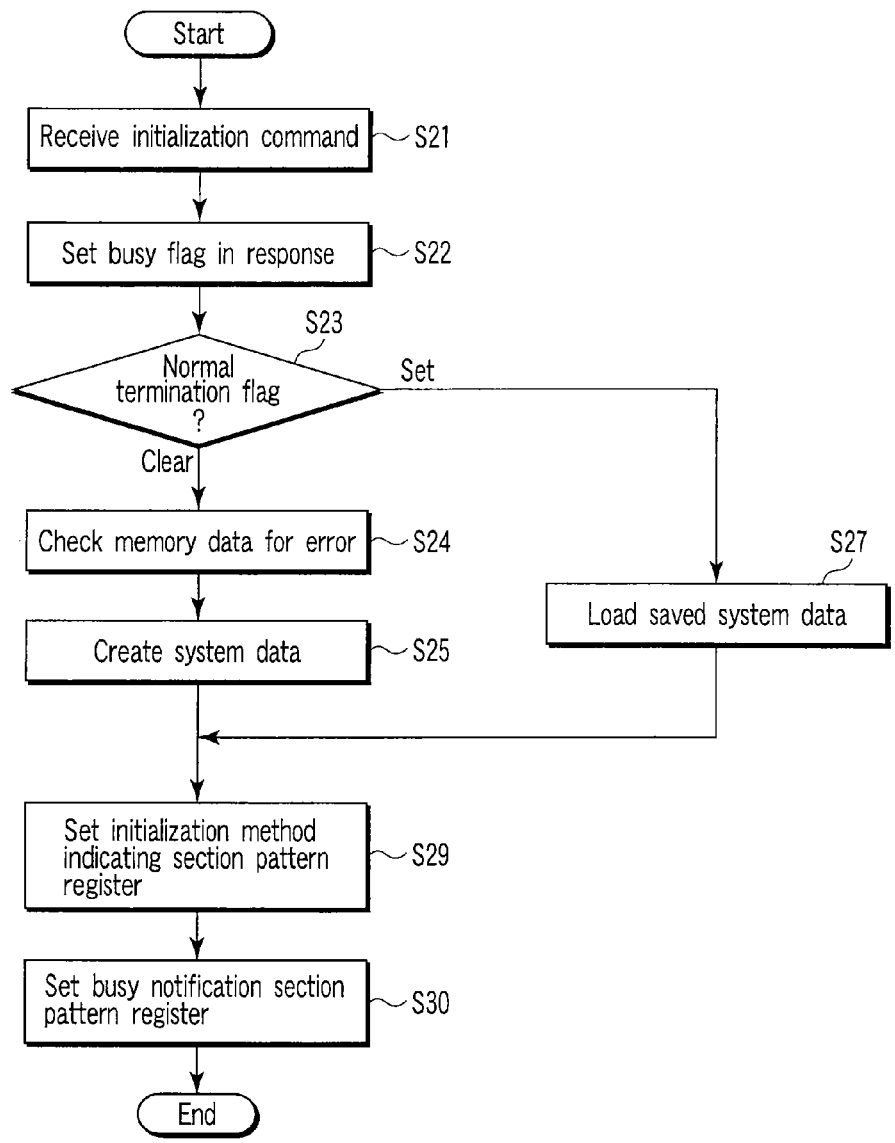
FIG. 14 is a flowchart showing a process executed by the card according to the first embodiment during initialization.

With reference to FIG. 14, description will now be given of a process executed by the card 1 during its initialization. FIG. 14 is a flowchart showing the process executed by the card 1 according to the first embodiment during initialization. As shown in FIG. 14, the card 1 receives the initialization command (step S21) and then returns a response to the initialization command. The busy notification section BS in the response has a bit pattern indicating the busy state (step S22). Subsequently, the host apparatus 2 keeps issuing the initialization command until the card 1 notifies the host apparatus 2 that the initialization process has been finished by clearance of the busy state. The card 1 starts the initialization process described below in response to the reception of the first initialization command. For the second and subsequent initialization commands, the same response is simply returned in which the busy notification section BS has the bit pattern indicating the busy state.

In the step S23, the card 1 examines the normal termination indicating flag 35 held within. When the last termination process has failed to complete, the normal termination indicating flag 35 is cleared. The card 1, then, performs a complete initialization. That is, step S24 is carried out. When the last termination process has completely finished, the normal termination indicating flag 35 is set. The card 1, then, performs a high-speed initialization. That is, step S27 is carried out. The complete initialization of step S24 is a conventional one and includes the error check of memory data and saving of system data.

In the complete initialization, the card 1 checks whether or not there is any error in the memory data stored in the NAND type flash memory 11. The memory data is damaged, for example, when the last power supply to the card 1 was inappropriately stopped during a write to the memory data. If the memory data are thus damaged, they are restored. The error checking process and the error correcting process may require a long time because they are executed on the entire area of the NAND type flash memory 11 in the card 1. The time increases consistently with the capacity of the memory.

Then, the card 1 creates and saves system data to RAM (step S25).

The high-speed initialization of step S27 finishes quicker than the complete initialization by omitting some process from the complete initialization or taking different procedures from the complete initialization. As an example of the high-speed initialization, in step S27, the card 1 reads the system data saved to the NAND type flash memory 11 during the last termination process, and loads the data onto RAM 25. If the saved system data are a part of the total system data, they are saved to RAM, while the remaining part is created again. The resulting system data are subsequently utilized. In the high-speed initialization, a check for an error in memory data and creation of system data, which are carried out during the complete initialization, are omitted.

After the system data have been read, the MPU 23 sets a bit pattern indicating which initialization method has been taken in the initialization method indicating section pattern register 36 (step S29). And then, the card 1 sets a bit pattern indicating the busy state has been cleared in the busy notification section pattern register 37 (step S30).

When receiving the next initialization command, the card 1 notifies these bit patterns set in the register 36 and 37 to the host apparatus 2 using the initialization method indicating section FI and the busy notification section BS in the response. When the host apparatus 2 receives the response, it stops the issuance of the initialization command. The initialization process is thus finished.

According to the first embodiment of the present invention, the card 1 can know that the host apparatus is about to stop supplying the power supply in advance and carries out the termination process to prepare for it. If the termination process has been normally completed, the high-speed initialization can be executed to finish the initialization quicker.

Thus, the initialization time can be reduced even though the reduction cannot be easily achieved simply by improving the complete initialization method in accordance with an increase in memory capacity. This reduces the requirements for the design of the card controller 12.

The present embodiment particularly can reduce the initialization time for the host apparatus 2 such as a digital camera, a movie camera, or the like, into which the card 1 remains inserted. This makes photographing immediately after power on possible, which is very practically effective.

The normal termination indicating flag 35 is cleared when the card 1 has changed its status such as when data write to the NAND type flash memory 11. This can omit the termination process as long as the card status remains the same. Clearance of the normal termination indicating flag 35 may be executed when the initialization completes. When this method is taken, the termination process must be performed every time the card 1 receives the function stop command even though the card status remains the same.

Second Embodiment

RAM 25 is a nonvolatile memory in the first embodiment. In contrast, RAM 25 is a nonvolatile magnetic random access memory (MRAM) or ferroelectric random access memory (FeRAM) in the second embodiment. In this case, a memory to which the system data is saved and an area in which the normal termination indicating flag 35 is provided are different from those according to the first embodiment. Several processes are also different from those used in the first embodiment. The differences will be described below.

FIG. 15 is a block diagram showing the configuration of hardware in the card according to the second embodiment of the present invention. In FIG. 15, a nonvolatile RAM 41 such as MRAM or FeRAM is provided in place of RAM 25, used in the first embodiment. The normal termination indicating flag 35 is provided in RAM 41 or the NAND type flash memory 11 (in the figure, the normal termination indicating flag 35 is shown in both RAM 41 and NAND type flash memory 11 for convenience).

In the present embodiment, all the system data created during the initialization of the card 1 are saved to RAM 41. Since MRAM and FeRAM are nonvolatile and can operate at high speed, the system data need not be moved to SRAM while the card 1 is in operation, compared to the first embodiment. Thus, in the process executed by the card 1 upon receiving the function stop command (FIG. 9), the processing in step S4 is not required. Further, in the process executed by the card 1 during initialization (FIG. 14), the processing in step S27 is not required. The remaining part of the process according to the present embodiment is the same as that according to the first embodiment.

The second embodiment of the present invention produces the same effects as those of the first embodiment.

Third Embodiment

FIG. 16 is a block diagram showing the configuration of hardware in a card according to a third embodiment. As shown in FIG. 16, nonvolatile RAM 41 is provided in addition to RAM 25 according to the first embodiment. The normal termination indicating flag 35 is provided in the nonvolatile RAM 41 or the NAND type flash memory 11 (in the figure, the normal termination indicating flag 35 is shown in both nonvolatile RAM 41 and NAND type flash memory 11 for convenience).

According to the present embodiment, a part of the system data created during the initialization of the card 1 is saved to the nonvolatile RAM 41. The remaining part of the system data is saved to the NAND type flash memory 11. Since RAM 41 is nonvolatile and can operate at high speed, the part of the system data which is to be saved to the nonvolatile RAM 41 is not moved to RAM 25 but operates on the nonvolatile RAM 41. On the other hand, the part of the system data which is to be saved to the NAND type flash memory 11 is moved to and remains in RAM 25 while the card 1 is in operation. This part of the system data is moved to the NAND type flash memory 11 as in the case of the first embodiment or to the nonvolatile RAM 41 when the supply of the power supply potential to the card 1 is stopped. When the data is easy to form using other data in the initialization, it may be discarded without being saved.

In the process executed by the card 1 upon receiving the function stop command (FIG. 9), the processing in step S4 corresponds to the operation of saving the part of the system data which is present on RAM 25 to the NAND type flash memory 11 or nonvolatile RAM 41. Further, in the process executed by the card 1 during initialization (FIG. 14), the processing in step S27 corresponds to the operation of reading and loading, onto RAM 25, the part of the processed or unprocessed system data which is present on the NAND type flash memory 11. The remaining part of the process is the same as that according to the first embodiment.

The third embodiment of the present invention produces the same effects as those of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory device comprising:
a memory; and
a controller configured to:
receive a first command, a second command, and a third command,
return a response indicating whether the memory device supports the third command in response to the second command,
in response to the third command, execute a process in accordance with the third command and shift to a low power mode,
not set a normal termination indicating flag when power supply to the memory device has been cutoff before completion of the shift to the low power mode,
execute a first initializing process in response to (1) the first command received after supplying a power to the memory device and (2) a fail of the process in accordance with the third command being received before a power supply to the memory device was stopped a previous time prior to power again being supplied to the memory device, and
execute a second initializing process in response to (1) the first command received after supplying the power to the memory device and (2) a success of the process in accordance with the third command being received before the power supply to the memory device was stopped the previous time prior to power again being supplied to the memory device; wherein
the second initializing process is completed quicker than the first initializing process; and
the first and second initializing processes are alternative processes executed for the memory device to be ready to be written and read by a request from a host.

2. The memory device according to claim 1, wherein the controller is further configured to return a status indicating whether the memory device has completed the process in accordance with the third command.

3. The memory device according to claim 1, wherein the controller is further configured to store a flag indicating the success of the process in accordance with the third command.

4. The memory device according to claim 3, wherein the flag is not set when power supply to the memory device has been cut off before completion of the process in accordance with the third command.

5. The memory device according to claim 1, wherein the second initializing process comprises the first initializing process whose part is omitted.

6. The memory device according to claim 5, wherein:
the process in accordance with the third command includes saving system data by the controller,
the first initializing process includes correcting errors of data stored in the memory, and the second initializing process includes loading and restoring the saved system data without the correcting errors of data in the first initializing process.

7. The memory device according to claim 6, wherein:
the memory comprises a nonvolatile memory,
the controller comprises a volatile memory, and
the process in accordance with the third command includes a write of at least a part of data stored in the volatile memory to the nonvolatile memory.

8. The memory device according to claim 7, wherein the volatile memory temporarily stores the system data.

9. The memory device according to claim 8, wherein the controller loads the system data saved in the nonvolatile memory to the volatile memory during the second initializing process.

* * * * *

UNITED STATES PATENT AND TRADEMARK OFFICE
CERTIFICATE OF CORRECTION

PATENT NO. : 8,533,367 B2
APPLICATION NO. : 13/792795
DATED : September 10, 2013
INVENTOR(S) : Akihisa Fujimoto It is certified that error appears in the above-identified patent and that said Letters Patent is hereby corrected as shown below:

On the title page, item (63) add after "Continuation of application No. 11/494,475, filed on Jul. 28, 2006, now Pat. No. 8,423,679." --which is Continuation of application No. PCT/JP2005/024205, filed on Dec. 26, 2005--.

Signed and Sealed this
First Day of April, 2014

Michelle K. Lee
*Deputy Director of the United States Patent and Trademark Office*